United States Patent [19]

Cuccolini

[11] Patent Number: 4,606,393
[45] Date of Patent: Aug. 19, 1986

[54] TIRE REMOVAL MACHINE WITH A SIMULTANEOUSLY MOVABLE TOOL CARRYING HEAD AND AUTOMATIC CENTERING UNIT

[75] Inventor: Maria Cuccolini, Correggio Emilia, Italy

[73] Assignee: Corghi Electromeccanica S.p.A., Correggio Emilia, Italy

[21] Appl. No.: 608,111

[22] Filed: May 8, 1984

[30] Foreign Application Priority Data

May 10, 1983 [IT] Italy .............................. 46837 A/83

[51] Int. Cl.⁴ ............................................ B60C 25/08
[52] U.S. Cl. .................................................. 157/1.24
[58] Field of Search ................... 157/1.17, 1.24, 1.26, 157/1.28

[56] References Cited

U.S. PATENT DOCUMENTS

| | | | |
|---|---|---|---|
| 3,029,862 | 4/1962 | Gambaroella | 157/1.24 |
| 3,086,578 | 4/1963 | Breazeale et al. | 157/1.24 |
| 3,164,199 | 1/1965 | Swenson et al. | 157/1.24 |
| 3,815,653 | 6/1974 | Scott et al. | 157/1.24 |
| 4,047,553 | 9/1977 | Kotila | 157/1.24 |
| 4,173,245 | 11/1979 | Schafer | 157/1.24 |
| 4,209,054 | 6/1980 | Parent | 157/1.28 |

*Primary Examiner*—James G. Smith

[57] ABSTRACT

A tire removal machine with its tool carrying head and automatic centering unit mutually mobile, comprising two parallel slides (12, 13) which swivel overall together with a support pivot (4) and are driven with relative mutual approach and withdrawal motion by a single drive unit (14, 15, 36), and with which there are respectively associated a slidable tool carrying head (39) and a rotatable automatic centering unit (26) for locking the wheel rims; during the operational stages the longitudinal axes of the head (39) and unit (26) are mutually orthogonal and incident, and the head (39) is disposed on the respective slide (12) by way of two automatic devices (60, 61, 62, 63, 64; 49, 51, 52, 54) which, during the return travel of the head (39), are arranged respectively to cause it to swivel outside the profile of the tire (3) being worked, and to torsionally release it with respect to its own swivel support (44).

10 Claims, 7 Drawing Figures

TIRE REMOVAL MACHINE WITH A SIMULTANEOUSLY MOVABLE TOOL CARRYING HEAD AND AUTOMATIC CENTERING UNIT

SUMMARY OF THE INVENTION

This industrial invention patent relates to a tire removal machine which is particularly but not exclusively suitable for the mounting/removal of tires of intermediate size, of the types suitable for well-based rims, tubless tire rims and ring rims, as are normally mounted on vans, trucks and agricultural machines.

Basically, the invention is suitable for the mounting-/removal of any type of tire mounted on rims having a diameter varying between 14 and 25 inches, corresponding to a maximum outer tire diameter of substantially 1.25 meters. For the mounting/removal of such tires, tire removal machines are known comprising a base; a vertically swivelling front arm which can slide parallel to the front of the machine and is provided upperly with adjustable tools for the bead-disengagement/removal/mounting of the tires; and a lateral bar vertically swivelling in a plane parallel to the swivel plane of said arm, said bar supporting in a cantilever manner, on the side facing this latter, an automatic centering unit for locking the rims.

In other types of known tire removal machines for the mounting/removal of such tires, the vertically swivelling front arm occupies a position which is stable relative to the front of the machine, whereas the travel necessary for the bead-disengagement/removal/mounting of the tires is undergone by the automatic centering unit, which is slidably mounted on said vertically swivelling lateral bar.

The use of the aforesaid tire removal machines has brought to light the drawbacks which are described briefly hereinafter. A first drawback consists of the fact that during the bead-disengagement/removal/mounting operations, the vertically swivelling front arm occupies a well defined position such that its longitudinal axis often does not intersect or is not incident with the corresponding longitudinal axis of the automatic centering unit, resulting in imperfect or non-optimum contact between the tool which is then being used and the tire being worked, said imperfect contact being able to give rise to damaging jamming between the tool and wheel rim, in particular when it is required to operate with considerable force. A further drawback is that the total travel required for each bead-disengagement/removal/-mounting stage is undergone in one case by the vertically swivelling front arm and in the other case by the slidable automatic centering head, which means that the corresponding tire removal machine is of excessive overall plan dimensions, and requires particularly sophisticated and strong, and thus heavy, guide and support structures to be provided, thus adding to the cost of the machine. It should also be noted that said overall dimensions, due to the aforesaid manner in which the total travel is arranged, often do not allow these known machines to be rationally disposed in their place of use. It should also be noted that the operating travel movements effected as heretofore described involve relatively lengthy times.

Finally, in the said known machines specified heretofore, the operator is required to carry out many lengthy manual operations such as swivelling the vertically swivelling front arm in order to insert/exclude the tools relative to the tire being worked, axially and angularly adjust the tools relative to said vertically swivelling front arm, and lock/release said tools. The present patent provides and protects a tire removal machine able to obviate all the aforesaid drawbacks by means of a simple and rational structural design.

According to the invention, the proposed tire removal machine comprises, on a base frame, a rotatable horizontal lateral pivot on which there are slidably mounted, by way of respective longitudinal slides, an arm and a support arranged to respectively support an automatic centering unit and a tool carrying head which, during operation, are driven with relative mutual approach and withdrawal motion by a single drive unit.

Furthermore, during said operation the longitudinal axes of said automatic centering unit and tool carrying head are constantly orthogonal and coplanar, i.e. incident, thus ensuring optium contact between the tools and the tire being worked.

According to the invention, the aforesaid drive unit comprises a motorised endless member, for example an endless chain, associated with said rotatable horizontal lateral pivot, its opposing straight portions being fixed to said slides in order to obtain said relative to-and-fro withdrawal and approach movement.

Furthermore, the tool carrying head is mounted slidably on its support so as to be able to be correctly positioned relative to the tire being worked, it comprises an automatic rotation release/locking device for selecting the tool to be used, and also comprises an automatic device for its engagement/disengagement with and from the respective slide, and which causes the head to swivel upwards in order to move said head outside the profile of the tire when it is to be brought to the other side of this latter. By virtue of the aforesaid characteristics, it is apparent that the invention is able to attain all the stated objects.

In this respect, the fact that said longitudinal axes are coplanar ensures optimum contact between the tools and tire, which prevents any interference between said tools and the respective wheel rim; the overall travel involved in the bead-disengagement/removal/mounting is reduced to one half, thus reducing the operating times and also the overall plan dimensions of the machine, thus reducing weight and costs, and ensuring good rigidity of the entire structure, without which it would be necessary to use over-dimensioned members; and finally practically all the operations involved in setting-up the machine for the relative working operations are automatic, with consequently practically no action required to be taken by the operator.

These and further constructional and operational merits and characteristics of the invention will be more apparent from the detailed description given hereinafter with reference to figures of the accompanying drawings, which show a preferred embodiment thereof by way of non-limiting example.

Figure 1:
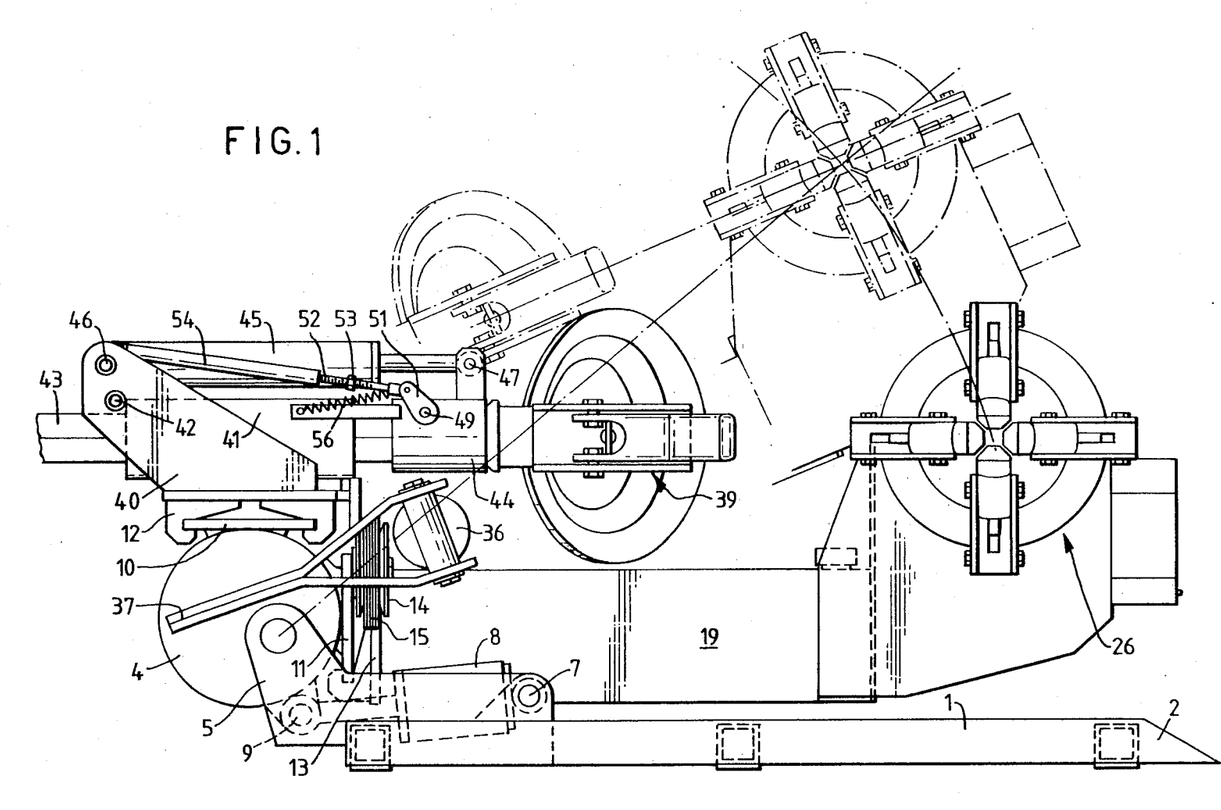
FIG. 1 is a front view of the invention.
Figure 2:
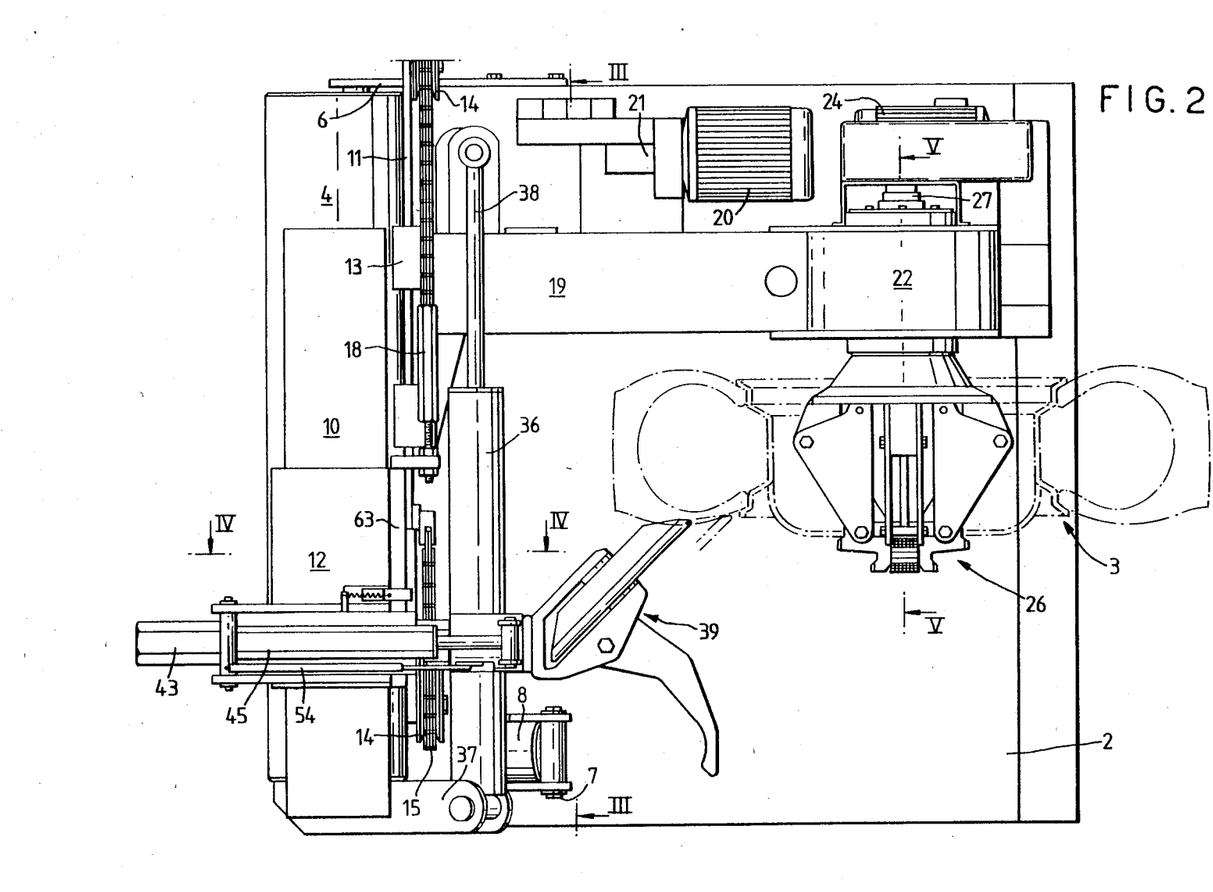
FIG. 2 is a plan view thereof.

From said figures it can be seen that the invention comprises a platform 1, on the right hand side of which there is an inclined surface 2 (FIG. 1) to enable a wheel 3 to be moved on to and off the machine, and on the left hand side of which there is a horizontal tube 4 mounted idly on respective end lugs 5 and 6 which are rigid with the platform 1 (FIGS. 1 and 2). To this latter there is hinged at 7 a hydraulic cylinder-piston unit 8 which is also hinged at 9 to the tube or pivot 4 in order to cause it to rotate and thus raise and lower the wheel 3 as described hereinafter. Two slide plates, namely an upper plate 10 and an inner lateral plate 11, on which respective slides 12 and 13 are mounted, are longitudinally fixed to the pivot 4.

Figure 3:
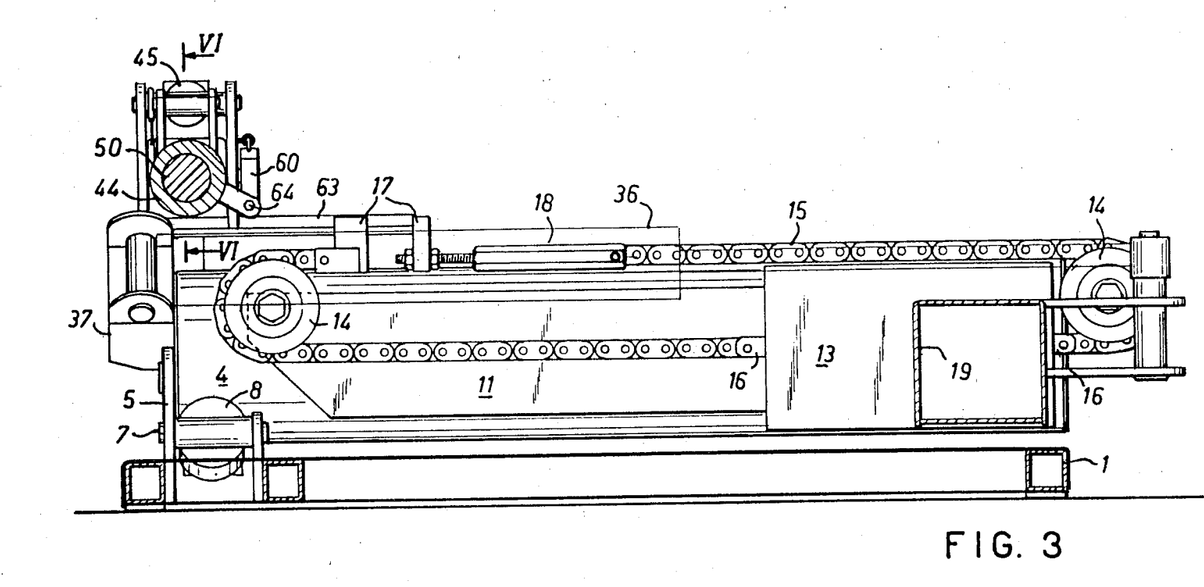
FIG. 3 is a section on the line III—III of FIG. 2.

In addition, on the slide plate 11 there are disposed two end pulleys 14 about which there passes an endless chain 15, the upper and lower straight portions of which are fixed at 16 to the slide 13, and at 17 to the slide 12 by way of a turnbuckle 18 (FIG. 3).

From the slide 13 there branches a hermetically sealed box-like arm 19 which acts as a tank for the oil for a rear motor 20—pump 21 unit (FIG. 2), this latter unit being rigid with the arm 19 which at its free end comprises a reduction gear unit 22 of the worm/helical gear type, which is driven by a belt transmission 23 (FIGS. 2 and 5) from a rear motor 24 fixed to the arm 19.

The helical gear 220 of the reduction gear unit 22 is keyed on to the casing 25 of a hydraulic cylinder-piston unit mounted idly on the arm 19. The casing 25 supports a front automatic centering unit 26 for locking the rims of the wheels 3, and is rotated by the reduction gear unit 22 during the known operations involved in the bead-disengagement/removal/mounting of a tire.

Said automatic centering unit 26 of known type comprises a collar 260 for its connection to the casing 25 (FIG. 5); a disc 261 and a spider 262 which are fixed to the end of the rod 250 of the cylinder-piston unit 25; four angularly equidistant chordal pins 263 which are positioned between said disc 261 and spider 262; four pairs of rocker arms 264 associated with said pins 263 and hinged at 265 to the collar 260; four double jaws 266 hinged to the rocker arms 264 and produced by precision casting; and four connecting rods 267 positioned between the pairs of rocker arms 264 and connecting the jaws 266 to the collar 260.

On the rear of the cylinder-piston unit 25 there is provided a rotary distributor 27 which comprises an inlet/outlet duct 28 for opening the jaws 266; an intermediate coaxial chamber 29 slidably housing a plunger 30 provided at its front with a push rod (FIG. 5); a ball valve 31 elastically urged towards its valve seat and towards said push rod; a duct 32 which runs from the compartment housing the ball valve 31 to the chamber for advancing the piston 33 of the cylinder-piston unit 25; and a duct 34 which runs from the chamber for retracting the piston 33 and opens into an outlet/inlet duct 35 of the distributor 27.

In order to open the double jaws 266, with simultaneous internal locking of the rim of a wheel 3, the pressurised oil enters by way of the duct 28, passes through the chamber 29 to keep the plunger 30 retracted, opens the valve 31 and passes through the duct 32 to force the piston 33 open. The discharging oil flows through the ducts 34 and 35.

At this point it should be noted that the advantageous presence of the elements 29, 30, 31 prevents the automatic centering unit from closing should the pressure in the chamber for advancing the piston 33 fall. In this respect, if this latter is forced to retract, the valve 31 closes automatically.

Figure 5:
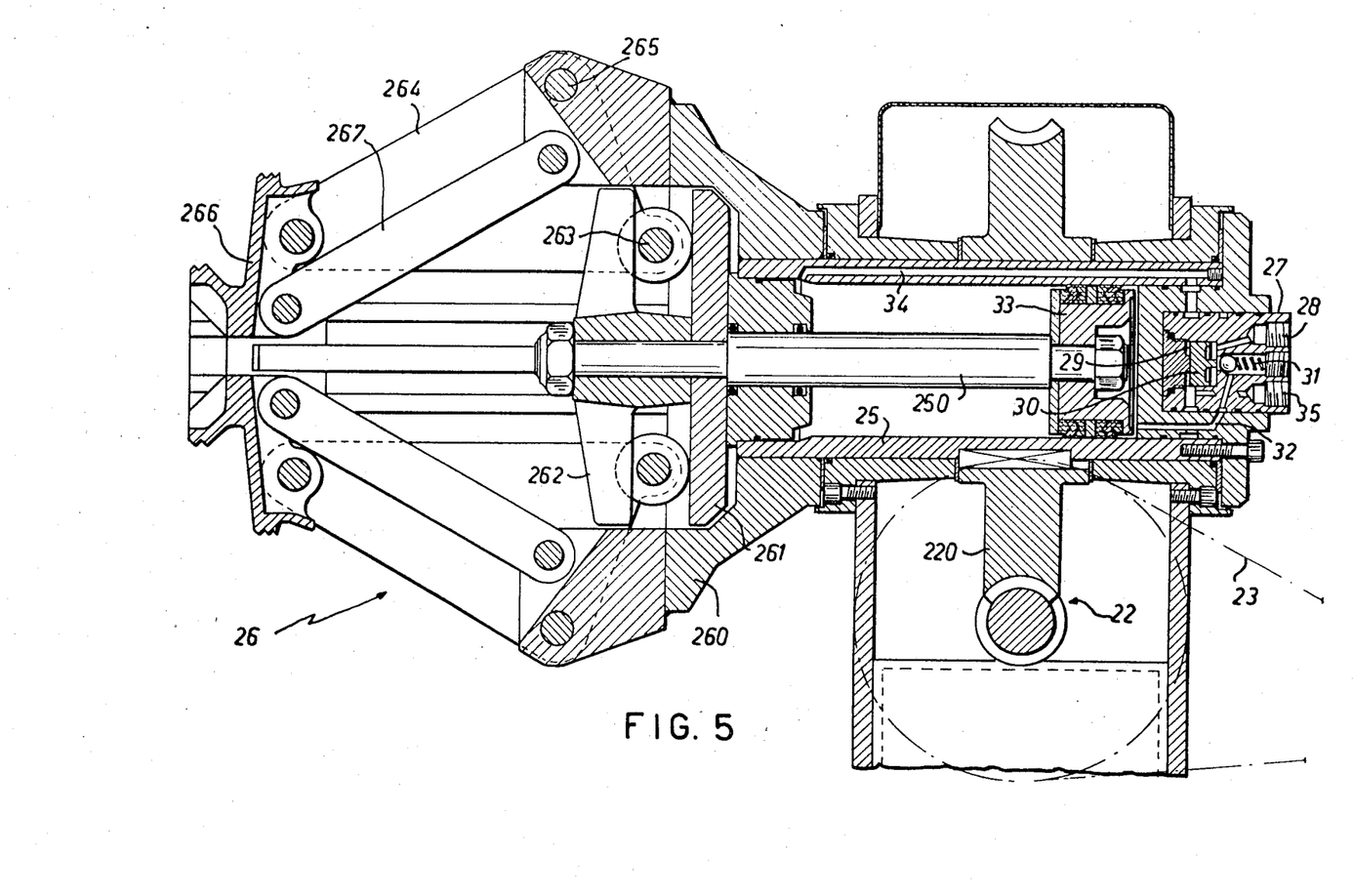
FIG. 5 is a section on the line V—V of FIG. 2.

During the closure of the automatic centering unit 26, the oil enters the retraction chamber through the ducts 35 and 34, and flows from the advancement chamber through the duct 32, the ball valve 31, the chamber 29 and the duct 28, said valve 31 being kept open by the inlet fluid which forces the plunger 30 towards the right in FIG. 5.

Figure 4:
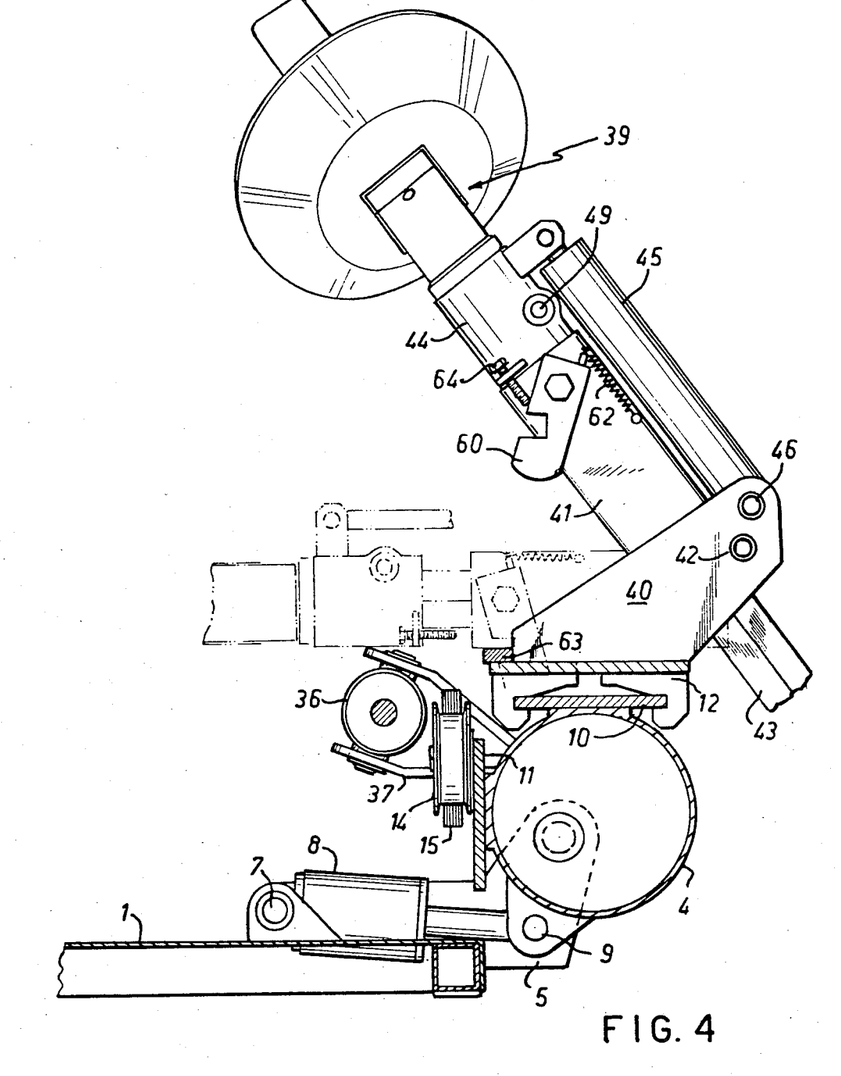
FIG. 4 is a section on the line IV—IV of FIG. 2.

From FIGS. 1, 2 and 4 it can be seen that the chain 15 is controlled by a hydraulic cylinder-piston unit 36 which is hinged by the elements 37 and 38 to the hollow pivot 4 and to the hollow arm 19. Orthogonally to the slides 12 (FIGS. 1 and 2) there is upperly provided a tool carrying head 39, of known type for the bead-disengagement/removal/mounting of the tires, its longitudinal axis during said operation being constantly coplanar and orthogonal, i.e. incident, with the longitudinal axis of the automatic centering unit 26, with the aforesaid advantages, and this being valid whatever the angular position occupied by the tube or hollow pivot 4 (FIG. 1).

For fitting the tool carrying head 39 to the slide 12 there are provided two salient profiled plates 40; a tubular member 41 hinged at 42 to said plates 40; a hexagonal bar 43 slidable in the tubular member 41; a sleeve 44 fixed to the end of the bar 43; a hydraulic cylinder-piston unit 45 which controls the outward/withdrawal travel of the tool carrying head 39 relative to the automatic centering unit 26, said cylinder-piston unit 45 being hinged upperly at 46 and 47 to the plate 40 and to the sleeve 44; and a shaft 48 for supporting the head 39 and rotatably mounted, in a manner such that it can be automatically locked/released, in the sleeve 44 (FIGS. 1, 2, 3, 4, 6, 7).

The automatic locking/release device for the shaft 48 comprises, as shown in FIGS. 1, 2, 6 and 7, a transverse pin 49 which is mounted idly in the top of the sleeve 44 and is provided with a slot 52 in the shape of a sector of a cylindrical surface of diameter practically equal to that of the shaft 48; an end lever 51 fixed to the pin 49; a rod 52 hinged to the lever 51, close to which it comprises a stop member 53; a tube 54 rigid with the cylinder-piston unit 45, and in which the rod 52 is slidably received; and two diametrically opposing transverse semicylindrical recesses 55 provided in the shaft 48 and on the same diameter as the pin 49.

This latter is constantly urged towards the locking position by a tension spring 56, whereas the shaft 48 is prevented from withdrawing from the sleeve 44, when said shaft 48 is released, by virtue of a ball 57 arranged for insertion into two diametrically opposing hemispherical recesses 58 in the shaft 48 which are provided for the selection of the tool to be used, and which are connected together by a circumferential guide groove 59 which is less deep than the recesses 58.

There is also provided an automatic locking/release device which is arranged to move the tool carrying head 39, with the aid of the cylinder-piston unit 45, to beyond the profile of the tire being worked, when the tools are to be transferred from one side to the other of the wheel 3.

As shown in FIGS. 2, 3, 4, 6 and 7, this latter device comprises a pawl 60 hinged at 61 to the tubular guide member 41 for the bar 43; an overlying tension spring 62 arranged to constantly urge the pawl 60 into its engaged position; an underlying plate 63 fixed to the slide 12, on to which the pawl 60 engages; and an adjustable push rod 64 associated with the sleeve 44 and provided for releasing said pawl.

During the bead-disengagement, removal or mounting of a tire, the tool carrying head 39 and automatic centering unit 26 are both swivelled into an upward position in accordance with the diameter of the tire being worked; the head 39 is locked by the two aforesaid devices, in an emerged position in proximity to the outer edge of the rim of the wheel 3; and said automatic centering unit 26 and head 39 move in opposite directions as heretofore stated, with simultaneous rotation of the unit 26. To pass to the other side of the wheel 3, the motion of the members 26 and 39 is reversed, and the tool carrying head 39 is also made to withdraw so that at a certain point its push rod 64 disengages the pawl 60, with the result that the tubular member 41 swivels upwards (FIG. 4).

Figure 6:
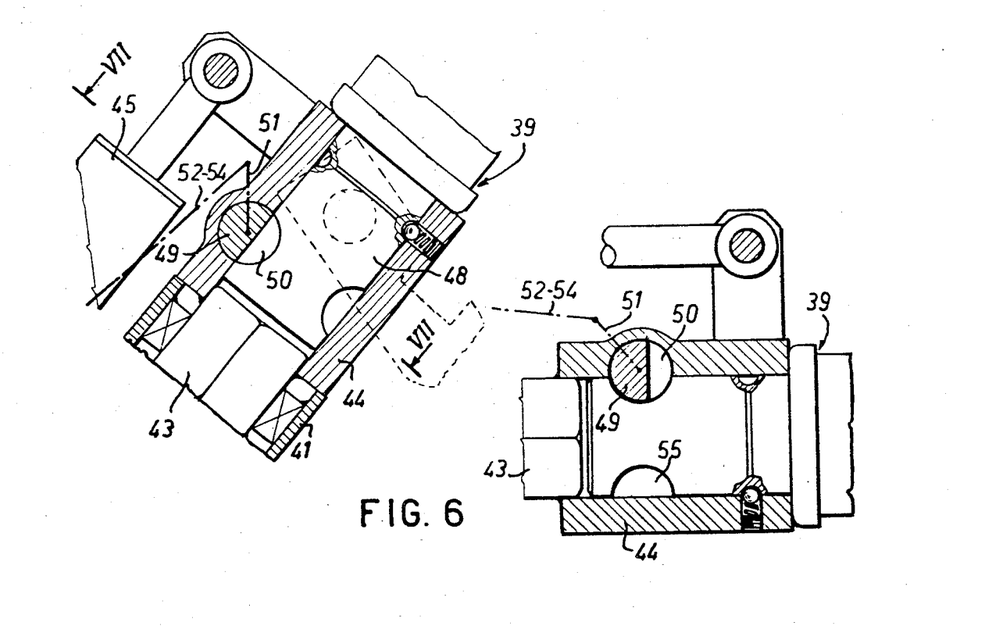
FIG. 6 is a section on the line VI—VI of FIG. 3.
Figure 7:
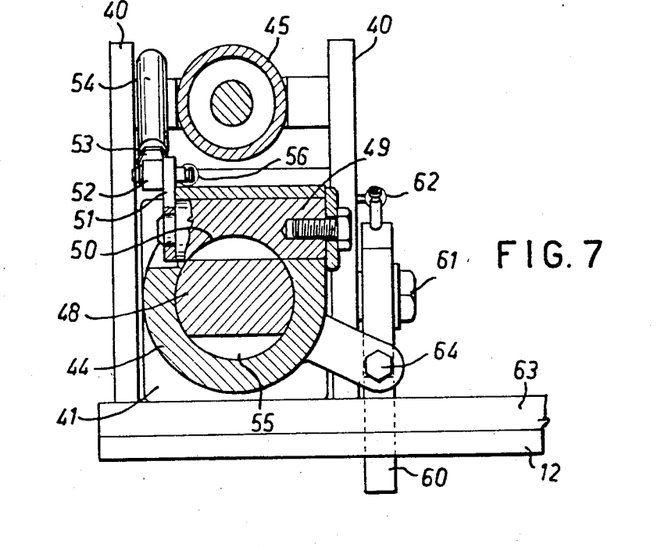
FIG. 7 is a section on the line VII—VII of FIG. 6.

At this point, if it is not required to change the previously used tool, the withdrawl of the head 39 can be halted, it can be moved to the other side of the wheel 3, and then lowered in order to carry out the subsequent operation. If however it is required to change the tool, the head 39 is made to withdraw completely (FIG. 4), with the result that it becomes torsionally released by virtue of the stop member 53 (FIGS. 1 and 6). The head 39 can then be rotated through 180° either before or after being lowered.

If said head 39, when lowered, occupies an incorrect angular position, it is necessary only to rotate it into the correct position, on which by virtue of the spring 56 the pin 48 becomes automatically inserted into the respective recess 55 in the shaft 48.

From the aforegoing it is apparent that all the operations involved in the working and the setting-up of the device according to the invention are automatic, with the exception of the rotation of the head 39. Finally it should be noted that all the controls for the aforesaid machine are advantageously grouped or incorporated into a single portable device, which the operator can dispose in the most convenient position in proximity to the device of the invention.

The invention is not limited to the single embodiment described and represented heretofore, and modifications and/or improvements can be made thereto but without leaving the scope of the inventive idea. For example, the chain 15 can be replaced by a cable, a geared motor unit can be provided instead of the cylinder-piston unit 36, and the two slides 12, 13 can be controlled by two facing toothed racks, with an interposed motorised pinion engaging with both.

What is claimed is:

1. A tire removal machine having a simultaneously movable tool carrying head and automatic unit, characterized by comprising,
   an operating platform (1),
   a rotatable lateral pivot (4) mounted on said platform,
   two longitudinal slides (13, 12), each having a longitudinal axis, disposed on said pivot,
   a single drive unit (14, 15, 36) operatively connected to said slides for simultaneous approach and withdrawl motion of said slides,
   a rotatable automatic centering unit (26) mounted on the first said slide for locking the wheel rims,
   a slidable tool carrying head (39) mounted on the second said slide,
   said longitudinal axis being mutually orthogonal and incident during the bead-disengagement-/removal/mounting operations,
   automatic release/locking means (60, 61, 62, 63, 64) between said head (39) and said second slide 12 for alternately raising and lowering said head (39) with respect to said second slide (12) in order to dispose said head (39) beyond the profile of the tire (3) being worked upon,
   and automatic means (49, 51, 52, 54) for alternately releasing and locking the rotation of said head (39) when this latter is completely withdrawn.

2. A machine as claimed in claim 1, characterized in that said rotatable lateral pivot comprises an elongated box member (4) rotatably mounted on said operating platform (1), a hydraulic cylinder-piston unit (8) connected to cause said pivot to swivel, and two slide members (10, 11) fixed to said pivot for carrying said longitudinal slides (12, 13).

3. A machine as claimed in claim 1, characterized in that a chain (15) is passed endlessly about two pulleys (14) supported by a slide member (11), said chain having opposing straight portions respectively coupled to said longitudinal slides (12, 13) by way of a turnbuckle (18); a box-like arm (19) acting as an oil tank branching from said first automatic centering unit (21) and having connected to its a hydraulic cylinder-piston unit (36), said unit being supported by said rotatable lateral pivot (4) and being provided in order to control the translatory movements of said chain (15).

4. A machine as claimed in claim 1, characterized in that between said tool carrying head (39) and said second longitudinal slide (12) there is provided a slide tube (41) hinged at its rear to said second slide (12); a rod (43) which is slidably but not rotatably housed in said tube (41); a sleeve (44) which is fixed to the end of said rod (43); an overlying hydraulic cylinder-piston unit (45) hinged to said second slide (12) and to said sleeve (44); and a shaft (48) for supporting said tool carrying head (39), said shaft (48) being inserted into said sleeve (44) by way of anti-withdrawal means (57, 58, 59).

5. A machine as claimed in claim 1 characterized in that said release/locking means for the vertical swivelling of the head (39) comprise a pawl (60) hinged to said second slide (12), a tension spring (62) arranged to constantly urge said pawl (60) elastically towards an engagement plate (63) associated with said second slide (12), and an adjustable releasing push rod (64) disposed on a sleeve (44) and arranged to make contact with said pawl (60) against the action of a spring (62) when said sleeve (44) is almost completely withdrawn; the completion of said withdrawal movement resulting in the corresponding upward swivelling of the head (39), under the action of a hydraulic cylinder-piston unit (45) which is provided for controlling the sliding of said head (39).

6. A machine as claimed in claim 1 characterized in that said anti-withdrawal means is provided that comprise a ball (57) which is housed in the wall of a sleeve (44), two diametrically opposing hemispherical recesses (58) provided in a shaft (49) supporting said head (39) in order to select the required tool, and a circumferential groove (59) which connects together said two recesses (58) and has a depth less than that of these latter.

7. A machine as claimed in claim 1, characterized in that said automatic means for the rotational locking-/release of the head (39) comprise a transverse rotatable pin (49) which occupies a chordal position relative to a sleeve (44) and a shaft (48); a transverse slot (50) provided in said pin (49) and shaped as a sector of a cylindrical surface of diameter equal to that of said shaft (48);

two diametrically opposing chordal grooves (55) provided in said shaft (48) and having a diameter equal to that of said pin (49); and a lever system (51, 52) which is associated with this latter, and of which the second component element (52) is slidably housed in a tube (54) rigid with a cylinder-piston unit (45) and is arranged to urge said pin (49) into a cylinder-piston unit (45) and is arranged to urge said pin (49) into a release position when said sleeve (44) is completely withdrawn.

8. A machine as claimed in claim 1, in which said automatic centering unit (26) comprises a set of jaws (266) which are radially movable under the control of a hydraulic cylinder-piston unit (25, 33) said unit is controlled by means of a rotary distributor (27), said distributor includes a duct (28, 32) for feeding oil into the advancement chamber of the cylinder-piston unit (25, 33) containing a ball valve (31) which is urged elastically towards its valve seat and is associated with a frontal slidable push rod (30) arranged to keep said valve (31) open during the regular feed to said distributor (27) and said cylinder-piston unit (25, 33), and to keep it closed when the feed pressure to said distributor (27) falls.

9. A machine as claimed in claim 4, characterized in that said release/locking means for the vertical swivelling of the head (39) comprise a pawl (60) hinged to said second slide (12), a tension spring (62) arranged to constantly urge said pawl (60) elastically towards an engagement plate (63) associated with said second slide (12), and an adjustable releasing push rod (64) disposed on said sleeve (44) and arranged to make contact with said pawl (60) against the action of a spring (62) when said sleeve (44) is almost completely withdrawn; the completion of said withdrawal movement resulting in the corresponding upward swivelling of the head (39), under the action of said hydraulic cylinder-piston unit (45) which is provided for controlling the sliding of said head (39).

10. A machine as claimed in claim 4, characterised in that said anti-withdrawal means comprise a ball (57) which is housed in the wall of said sleeve (44), two diametrically opposing hemispherical recesses (58) provided in a shaft (49) supporting said head (39) in order to select the required tool and a circumferential groove (59) which connects together said two recesses (58) and has a depth less than that of these latter.

* * * * *